(12) United States Patent
Ochi

(10) Patent No.: US 12,191,506 B2
(45) Date of Patent: Jan. 7, 2025

(54) REDOX FLOW BATTERY CELL, CELL STACK AND REDOX FLOW BATTERY SYSTEM

(71) Applicant: SUMITOMO ELECTRIC INDUSTRIES, LTD., Osaka (JP)

(72) Inventor: Yuta Ochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 43 days.

(21) Appl. No.: 17/626,382

(22) PCT Filed: Jul. 18, 2019

(86) PCT No.: PCT/JP2019/028371
§ 371 (c)(1),
(2) Date: Jan. 11, 2022

(87) PCT Pub. No.: WO2021/009928
PCT Pub. Date: Jan. 21, 2021

(65) Prior Publication Data
US 2022/0263101 A1    Aug. 18, 2022

(51) Int. Cl.
*H01M 4/96* (2006.01)
*H01M 4/86* (2006.01)
*H01M 8/18* (2006.01)

(52) U.S. Cl.
CPC .............. *H01M 4/96* (2013.01); *H01M 8/188* (2013.01); *H01M 2004/8684* (2013.01); *H01M 2004/8689* (2013.01)

(58) Field of Classification Search
None
See application file for complete search history.

(56) References Cited

U.S. PATENT DOCUMENTS

| 6,509,119 | B1 * | 1/2003 | Kobayashi | C01B 32/20 |
| | | | | 429/105 |
| 2008/0038589 | A1 | 2/2008 | Nakamura et al. | |
| 2015/0207151 | A1 | 7/2015 | Utsunomiya et al. | |
| 2018/0316017 | A1 | 11/2018 | Hanafusa et al. | |
| 2020/0152997 | A1 | 5/2020 | Nakaishi et al. | |
| 2021/0143437 | A1 * | 5/2021 | Tomita | H01M 8/188 |

FOREIGN PATENT DOCUMENTS

| CN | 101002354 | A | 7/2007 | |
| JP | 2003-142141 | A | 5/2003 | |
| JP | 2006-147374 | A | 6/2006 | |
| JP | 6434192 | B2 * | 12/2018 | ............ H01M 4/368 |
| TW | 201415702 | A | 4/2014 | |
| WO | 2017/068944 | A1 | 4/2017 | |
| WO | 2017/138287 | A1 | 8/2017 | |

OTHER PUBLICATIONS

U.S. Appl. No. 17/626,173, filed Jan. 11, 2022 in the name of Yuta Ochi.
Mar. 28, 2023 Office Action issued in U.S. Appl. No. 17/626,173.
Oct. 6, 2023 Notice of Allowance issued in U.S. Appl. No. 17/626,173.

* cited by examiner

*Primary Examiner* — Haroon S. Sheikh
(74) *Attorney, Agent, or Firm* — Oliff PLC

(57) ABSTRACT

A redox flow battery cell includes a positive electrode and a negative electrode, and each of the positive electrode and the negative electrode is an assembly containing a plurality of carbon fibers, and a quantity per unit area of the positive electrode is larger than a quantity per unit area of the negative electrode.

9 Claims, 2 Drawing Sheets

REDOX FLOW BATTERY CELL, CELL STACK AND REDOX FLOW BATTERY SYSTEM

TECHNICAL FIELD

The present disclosure relates to a redox flow battery cell, a cell stack and a redox flow battery system.

BACKGROUND ART

As one of storage batteries, there is a redox flow battery. In a redox flow battery, charge and discharge are performed with a positive-electrode electrolyte solution and a negative-electrode electrolyte solution supplied to a positive electrode and a negative electrode, respectively. PTL 1 discloses operating a redox flow battery in such a manner that a state of charge (SOC) of a positive-electrode electrolyte solution becomes no more than 75%.

CITATION LIST

Patent Literature

PTL 1: Japanese Patent Laying-Open No. 2006-147374

SUMMARY OF INVENTION

A redox flow battery cell of the present disclosure includes a positive electrode and a negative electrode, and
each of the positive electrode and the negative electrode is an assembly containing a plurality of carbon fibers and
a quantity per unit area of the positive electrode is larger than a quantity per unit area of the negative electrode.
A cell stack of the present disclosure includes a plurality of the redox flow battery cells of the present disclosure.
A redox flow battery system of the present disclosure includes the redox flow battery cell of the present disclosure or the cell stack of the present disclosure.

DETAILED DESCRIPTION

Figure 1:
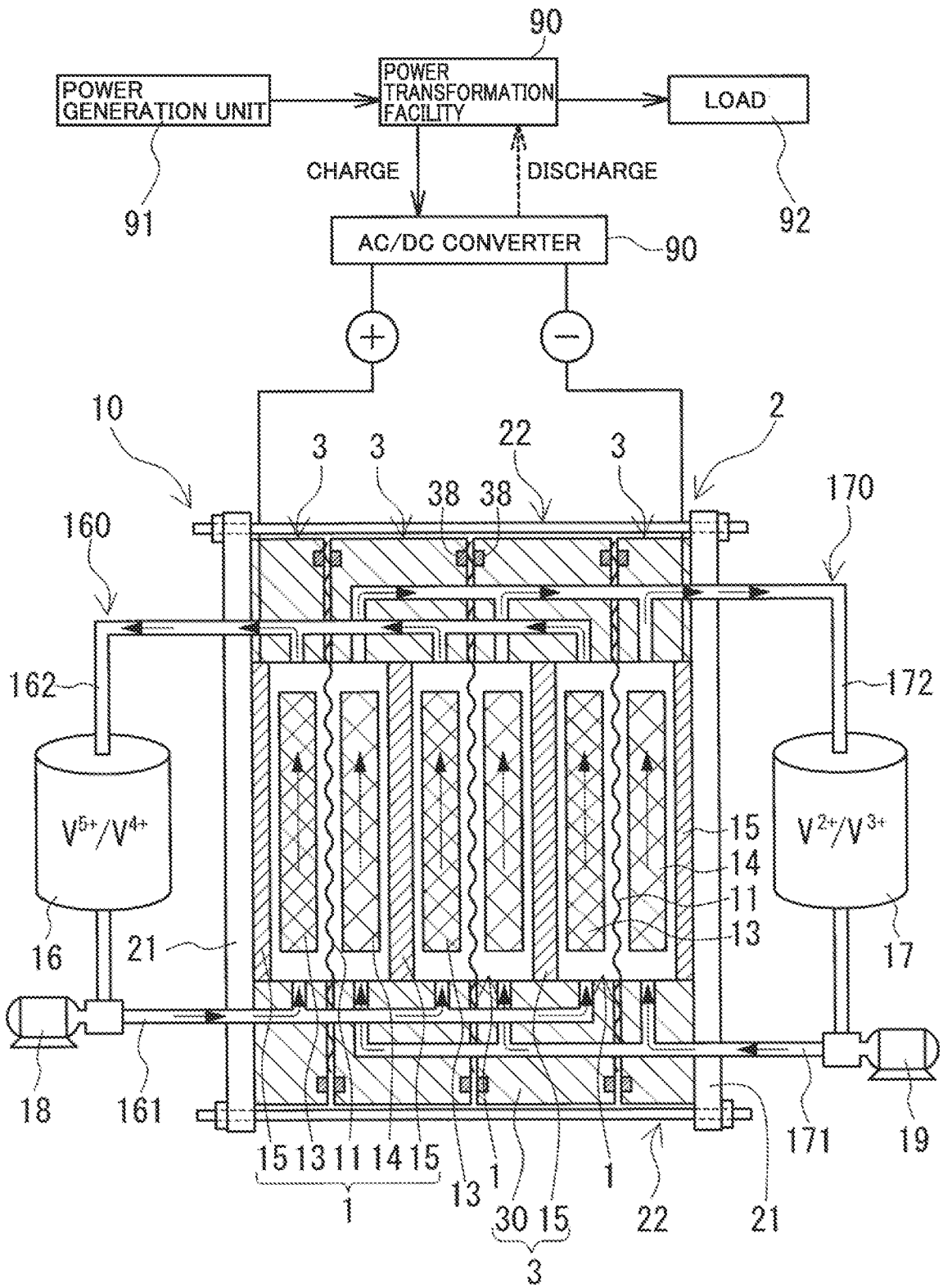
FIG. 1 is a configuration diagram illustrating an overview of a redox flow battery system according to an embodiment.

Problem to be Solved by the Present Disclosure

Preventing excessive oxidation of a positive electrode in a redox flow battery is desired.

A positive-electrode electrolyte solution used in a redox flow battery may contain highly oxidative ions. Hereinafter, highly oxidative ions may be referred to as "oxidizer ions". For example, in a vanadium-based electrolyte solution described in PTL 1, the oxidizer ions are vanadium (V) ions. Where a positive electrode included in the redox flow battery is a compact in which a plurality of carbon fibers are assembled, for example, carbon felt, the positive electrode is oxidized by the oxidizer ions such as vanadium (V) ions.

In a vanadium-based electrolyte solution, as an SOC rises along with progress of charging, a concentration of vanadium (V) ions in the positive-electrode electrolyte solution increases. Because of the vanadium (V) ion increase, a speed of oxidation of the aforementioned positive electrode formed of, e.g., carbon felt also increases. In a state in which the SOC exceeds 100%, that is, an overcharge state, the concentration is even higher. Therefore, oxidation of the positive electrode easily progresses and the positive electrode is excessively oxidized. With the excessively oxidized positive electrode, battery reactivity is lowered.

As described in PTL 1, overcharge can be prevented by performing charge-discharge operation in such a manner that the SOC of the electrolyte solution remains within a predetermined range by monitoring the SOC. As a result, it is possible to prevent progress of oxidation of the positive electrode. However, if the SOC cannot properly be measured because of, e.g., a failure of an SOC monitoring device, for example, a device that measures an open circuit voltage (OCV), control to stop charging when the SOC reaches a predetermined value that is less than 100% cannot be performed. Therefore, the positive-electrode electrolyte solution may be overcharged. Therefore, it is desirable to prevent overcharging of the positive-electrode electrolyte solution without monitoring the SOC or the OCV, and thus to prevent excessive oxidation of the positive electrode.

Therefore, an object of the present disclosure is to provide a redox flow battery cell that enables preventing excessive oxidation of a positive electrode. Also, another object of the present disclosure is to provide a cell stack and a redox flow battery system that enable preventing excessive oxidation of a positive electrode.

Advantageous Effect of the Present Disclosure

The redox flow battery cell of the present disclosure, the cell stack of the present disclosure and the redox flow battery system of the present disclosure enable preventing excessive oxidation of a positive electrode.

DESCRIPTION OF EMBODIMENTS

First, a list and description of embodiments of the present disclosure will be provided.

(1) A redox flow battery cell according to an aspect of the present disclosure includes a positive electrode and a negative electrode, and
each of the positive electrode and the negative electrode is an assembly containing a plurality of carbon fibers and
a quantity per unit area of the positive electrode is larger than a quantity per unit area of the negative electrode.

Hereinafter, "redox flow battery cell" may be referred to as "RF battery cell".

The RF battery cell of the present disclosure enables preventing excessive oxidation of the positive electrode because of the following reasons. In particular, the RF battery cell of the present disclosure enables preventing excessive oxidation of the positive electrode without monitoring a state of charge (SOC) or an open circuit voltage (OCV).

In a negative-electrode cell including a negative electrode having a relatively small quantity per unit area, as charging progresses, a phenomenon other than battery reaction tends to occur. The phenomenon is, for example, generation of hydrogen gas. Therefore, stopping charging based on an amount of hydrogen gas generated enables preventing overcharging of the positive-electrode electrolyte solution. In other words, it is possible to prevent an excessive increase in concentration of highly oxidative ions such as vanadium (V) ions in the positive-electrode electrolyte solution. Where the concentration of the oxidizer ions is not too high, there are not too many oxidizer ions, and thus, oxidation of the positive electrode does not easily progress. Also, using such a phenomenon attributable to a decrease in battery reactivity in the negative electrode as a trigger for stopping charging enables proper operation without monitoring the SOC or the OCV.

(2) An example of the RF battery cell of the present disclosure may be
an example in which a ratio of the quantity per unit area of the positive electrode to the quantity per unit area of the negative electrode is no less than 107%.

Under same operating conditions, in a case where the above ratio is no less than 107%, as charging progresses, the amount of hydrogen gas generated tends to be large in comparison with a case where the above ratio is less than 107%. Therefore, stopping charging based on the amount of hydrogen gas generated enables more reliably preventing overcharging of the positive-electrode electrolyte solution.

(3) An example of the RF battery cell of the present disclosure may be
an example in which the quantity per unit area of the positive electrode and the quantity per unit area of the negative electrode are no less than 20 g/m$^2$ and no more than 500 g/m$^2$.

The above example enables easily adjusting a cell resistance into a practical range.

(4) An example of the RF battery cell of the present disclosure may be
an example in which an average fiber diameter of the carbon fiber is no more than 20 μm.

In the above example, in comparison with a case where the average fiber diameter is more than 20 μm, as charging progresses, the battery reactivity of the negative electrode tends to be lowered. Therefore, as charging progresses, the amount of hydrogen gas generated tends to be large. Accordingly, stopping charging based on the amount of hydrogen gas generated enables more reliably preventing overcharging of the positive-electrode electrolyte solution.

(5) A cell stack according to an aspect of the present disclosure includes a plurality of the RF battery cells according to any one of (1) to (4) above.

For the aforementioned reasons, the cell stack of the present disclosure enables preventing excessive oxidation of the positive electrode without monitoring the SOC or the OCV.

(6) A redox flow battery system according to an aspect of the present disclosure includes the RF battery cell according to any one of (1) to (4) above or the cell stack according to (5) above.

Hereinafter, "redox flow battery system" may be referred to as "RF battery system".

For the above reasons, the RF battery system of the present disclosure enables preventing excessive oxidation of the positive electrode without monitoring the SOC or the OCV.

DETAILS OF THE EMBODIMENTS OF THE PRESENT DISCLOSURE

The redox flow battery cell, the cell stack and the redox flow battery system of the embodiments of the present disclosure will be described below with reference to the drawings. In the drawings, signs that are same denote elements of same names.

EMBODIMENTS

An overview of an RF battery cell 1 of an embodiment, a cell stack 2 of an embodiment and an RF battery system 10 of an embodiment will be described with reference to FIGS. 1 and 2. Then, a positive electrode 13 and a negative electrode 14 included in RF battery cell 1 of the embodiment will be described in detail.

Overview

RF battery cell 1 of an embodiment includes a positive electrode 13 and a negative electrode 14 and is used for a main element of RF battery system 10 RF battery system 10 is one of electrolyte solution circulation-type storage batteries and performs charge and discharge with a positive-electrode electrolyte solution and a negative-electrode electrolyte solution supplied to positive electrode 13 and negative electrode 14, respectively.

In particular, in RF battery cell 1 of the embodiment, each of positive electrode 13 and negative electrode 14 is an assembly containing a plurality of carbon fibers. Also, a quantity per unit area $W_3$ of positive electrode 13 is larger than a quantity per unit area $W_4$ of negative electrode 14. In other words, $W_4 < W_3$ and $W_3 \neq W_4$. In RF battery cell 1, excessive oxidation of positive electrode 13 is prevented by use of the difference between quantities per unit area $W_3$, $W_4$ In FIGS. 1 and 2, positive electrode 13 and negative electrode 14 are cross-hatched.

Cell stack 2 of an embodiment includes a plurality of RF battery cells 1 of the embodiment. RF battery system 10 of an embodiment includes RF battery cell 1 of the embodiment or cell stack 2 of the embodiment.

(Battery Cell)

Each RF battery cell 1 typically includes a positive electrode 13, a negative electrode 14 and a separator 11 and is built using later-described cell frames 3. Positive electrode 13 and negative electrode 14 each provide a field for battery reaction. Separator 11 is interposed between positive electrode 13 and negative electrode 14 and separates positive electrode 13 and negative electrode 14 from each other. Examples of separator 11 include, e.g., an ion-exchange membrane.

Each cell frame 3 includes a bipolar plate 15 and a frame body 30. Bipolar plate 15 is a conductive plate. A constituent material of bipolar plate 15 may be, for example, conductive plastic. As illustrated in FIG. 2, frame body 30 is an insulating frame plate disposed around bipolar plate 15. A constituent material of frame body 30 may be, for example, resin such as vinyl chloride resin.

Figure 2:
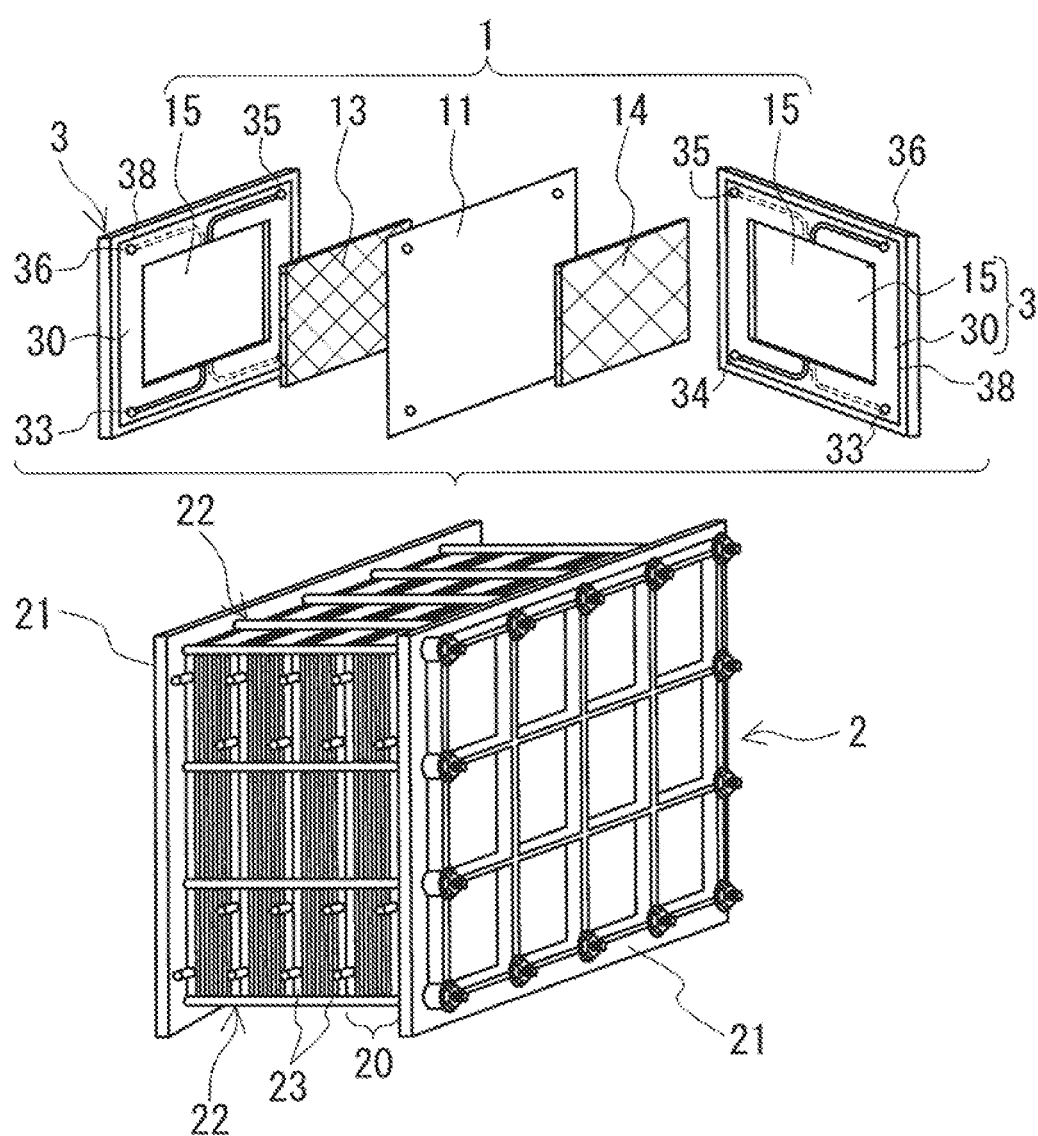
FIG. 2 is a perspective view illustrating an overview of a battery cell according to an embodiment and a cell stack according to an embodiment.

As illustrated in the cell frame 3 on the left side of the sheet of the exploded view in FIG. 2, each frame body 30 includes a solution-supply manifold 33, a solution-drainage manifold 35 and slits for a positive-electrode electrolyte solution. One surface of frame body 30 supplies a positive-electrode electrolyte solution to positive electrode 13 on bipolar plate 15 using solution-supply manifold 33 and the solution supply-side slit. Also, the one surface of frame body 30 drains the positive-electrode electrolyte solution from positive electrode 13 using solution-drainage manifold 35 and the solution-drainage-side slit. As illustrated in the cell frame 3 on the right side of the sheet of the exploded view in FIG. 2, each frame body 30 includes a solution-supply manifold 34, a solution-drainage manifold 36 and slits for a negative-electrode electrolyte solution. As with positive electrode 13 described above, another surface of frame body 30 supplies a negative-electrode electrolyte solution to negative electrode 14 and drains the negative-electrode electrolyte solution from negative electrode 14.

As illustrated in the exploded view in FIG. 2, a single-cell battery including one RF battery cell 1 includes a cell frame 3, a positive electrode 13, a separator 11, a negative electrode 14 and a cell frame 3 and is built by these components being arranged in the order mentioned A multi-cell battery including a plurality of RF battery cells 1 includes a plurality of positive electrodes 13, a plurality of negative electrodes 14, a plurality of separators II and three or more cell frames 3. As illustrated in FIGS. 1 and 2, the multi-cell battery includes a stack body in which a cell frame 3, a positive electrode 13, a separator 11 and a negative electrode 14 are stacked in the order mentioned. As illustrated in FIG. 1, a bipolar plate 15 of each of cell frames 3 included in the stack body is typically interposed between relevant positive electrode 13 and relevant negative electrode 14.

(Cell Stack)

In the multi-cell battery, a form called a cell stack is used for RF battery cells 1. As illustrated in FIGS. 1 and 2, cell stack 2 typically includes the above-described stack body, a pair of end plates 21 and a plurality of fastening members 22. The pair of end plates 21 holds the stack body therebetween. Each fastening member 22 typically includes a long bolt and a nut. The plurality of fastening members 22 fasten end plates 21 to each other. Each of frame bodies 30 in the present example includes a seal material 38. The stack body is held in a liquid-tight manner by means of the above fastening and seal material 38.

As illustrated in FIG. 2, cell stack 2 may include a plurality of sub cell stacks 20. Each sub cell stack 20 includes a stack body of a predetermined number of RF battery cells 1, and a pair of supply/drainage plates 23 that hold the stack body therebetween. Pipings 160, 170, which are illustrated in FIG. 1, are connected to supply/drainage plates 23.

(RF Battery System)

RF battery system 10 includes an RF battery cell 1, and a circulation mechanism that supplies a positive-electrode electrolyte solution and a negative-electrode electrolyte solution to RF battery cell 1. The RF battery cell 1 included in RF battery system 10 may be a cell stack 2. The same applies to the below in this section.

As illustrated in FIG. 1, RF battery cells 1 are typically connected to a power generation unit 91 and a load 92 via intervening devices 90. With the positive-electrode electrolyte solution and the negative-electrode electrolyte solution supplied, RF battery cells 1 perform charging using power generation unit 91 as a power supply source and perform discharging to load 92 that is a power providing target.

Intervening devices 90 may be, for example, an AC/DC converter or a power transformation facility. Power generation unit 91 may be, for example, a solar power generator, a wind power generator or another general power plant. Load 92 may be, for example, a power system or a consumer of power. RF battery system 10 is used for, for example, load equalization, instantaneous voltage drop compensation or an emergency power source or output equalization of renewable energy power generation such as photovoltaic power generation or wind power generation.

<Circulation Mechanism>

The circulation mechanism includes tanks 16, 17, pipings 160, 170 and pumps 18, 19. Tank 16 stores the positive-electrode electrolyte solution. Tank 17 stores the negative-electrode electrolyte solution. Piping 160 includes an outward piping 161 and a return piping 162. Piping 170 includes an outward piping 171 and a return piping 172. Pipings 160, 170 are connected to respective tanks 16, 17 and RF battery cells 1. Pumps 18, 19 are connected to respective outward pipings 161, 171. The positive-electrode electrolyte solution from tank 16 and the negative-electrode electrolyte solution from tank 17 are supplied to positive electrodes 13 and negative electrodes 14 of RF battery cells 1 through outward pipings 161, 171 by pumps 18, 19, respectively. The positive-electrode electrolyte solution from positive electrodes 13 and the negative-electrode electrolyte solution from negative electrodes 14 return to tanks 16, 17 through return pipings 162, 172, respectively. The black pointed arrows in FIG. 1 indicate flows of the electrolyte solutions.

(Electrolyte Solutions)

For the electrolyte solutions, a solution containing ions that function as an active material, that is, a solution containing active material ions can be employed. As a typical electrolyte solution used for RF battery system 10, there is an aqueous solution containing active material ions and an acid. Examples of positive-electrode active material ions include, e.g., vanadium ions, manganese ions and iron ions. Examples of negative-electrode active material ions include, e.g., vanadium ions, titanium ions and chromium ions. In the case of vanadium-based electrolyte solutions, the positive-electrode active material ions and the negative-electrode active material ions are both vanadium ions and are different from each other in valence of vanadium ion. In FIG. 1, an example in which vanadium ions having different valences are employed as the positive-electrode active material ions and the negative-electrode active material ions is illustrated.

In RF battery cells 1, cell stack 2 and RF battery system 10, for e.g., a basic configuration and constituent materials and composition of the electrolyte solutions, those that are publicly known may be used.

(Electrodes)

For each of positive electrode 13 and negative electrode 14 included in RF battery cell 1 of the embodiment, an assembly containing a plurality of carbon fibers is used. Hereinafter, an assembly containing a plurality of carbon fibers may be referred to as "fiber assembly". The fiber assembly may be, for example, carbon felt, carbon cloth or carbon paper.

<Quantities Per Unit Area>

Although each of positive electrode 13 and negative electrode 14 is the aforementioned fiber assembly, but positive electrode 13 and negative electrode 14 are different in quantity per unit area of the fiber assembly. A quantity per unit area of a fiber assembly here means a mass per unit area of a fiber assembly, and here, a gram per square meter $(g/m^2)$.

<<Quantity-Per-Unit-Area Ratio>>

Quantitatively, a ratio of quantity per unit area $W_3$ of positive electrode 13 to quantity per unit area $W_4$ of negative electrode 14 $[(W_3/W_4) \times 100]$ exceeds 100%, and $W_4 < W_3$. Hereinafter, the ratio is referred to as "quantity-per-unit-area ratio".

Because of quantity per unit area $W_4$ of negative electrode 14 being relatively small, as charging progresses, battery reactivity of negative electrode 14 tends to be lowered in comparison with battery reactivity of positive electrode 13.

More specifically, upon a charge operation of RF battery cell 1, as the charging progresses, charging ions, for example, vanadium (V) ions in the vanadium-based electrolyte solution, increase in a positive-electrode cell including positive electrode 13. On the other hand, in a negative-electrode cell including negative electrode 14, a phenomenon other than battery reaction tends to occur at a relatively early stage. For example, where the electrolyte solution is a vanadium-based electrolyte solution, which is an aqueous solution, electrolysis of water tends to occur. Therefore, hydrogen gas is easily generated. The battery reactivity of negative electrode 14 is relatively lowered because of, e.g., difficulty in supply of the negative-electrode electrolyte solution to negative electrode 14 due to, e.g., generation of hydrogen gas.

Therefore, it is possible to stop charging before overcharging of the positive-electrode electrolyte solution, based on an amount of hydrogen gas generated. Therefore, it is possible to prevent an excessive increase in concentration of highly oxidative ions in the positive-electrode electrolyte solution. Preventing an excessive increase in concentration of oxidizer ions enables preventing progress of oxidation of positive electrode 13 by oxidizer ions.

As the aforementioned quantity-per-unit-area ratio is larger, excessive oxidation of positive electrode 13 is more easily prevented. The quantity-per-unit-area ratio is, for example, no less than 107%.

Under same operating conditions, in a case where the quantity-per-unit-area ratio is no less than 107%, as charging progresses, the amount of hydrogen gas generated easily increases in comparison with a case where the quantity-per-unit-area ratio is more than 100% and less than 107%. Therefore, the concentration of oxidizer ions in the positive-electrode electrolyte solution in the former case of no less than 107% is lower than that in the latter case of less than 107%. Therefore, stopping charging based on the amount of hydrogen gas generated prevents an excessive increase of the concentration in the positive-electrode electrolyte solution, and thus, the positive-electrode electrolyte solution can easily enter a state in which the amount of oxidizer ions is relatively small. Therefore, overcharging of the positive-electrode electrolyte solution is more reliably prevented.

Where the aforementioned quantity-per-unit-area ratio is no less than 110%, more specifically no less than 115%, even more specifically no less than 120%, it is possible to stop charging to an extent that the concentration of oxidizer ions is not too high. Therefore, overcharging of the positive-electrode electrolyte solution can more easily be prevented.

Where the aforementioned quantity-per-unit-area ratio is, for example, no more than 180%, it is conceivable that even if charging progresses, the amount of hydrogen gas generated tends to remain within an allowable range. Where the quantity-per-unit-area ratio is no more than 175%, more specifically no more than 170%, the amount of hydrogen gas generated further easily becomes smaller. Also, a drastic decrease in battery capacity is prevented.

<<Absolute Value>>

Quantity per unit area $W_3$ of positive electrode 13 and quantity per unit area $W_4$ of negative electrode 14 may be, for example, no less than 20 g/m$^2$ and no more than 500 g/m$^2$.

Where quantities per unit area $W_3$, $W_4$ are both no less than 20 g/m$^2$, an amount of carbon fibers loaded is not too small and positive electrode 13 and negative electrode 14 can each properly function as a battery reaction field. Therefore, an RF battery cell 1 that is not too large in cell resistance and that is convenient can be provided. As quantities per unit area $W_3$, $W_4$ are larger, positive electrode 13 and negative electrode 14 are more excellent in battery reactivity. Therefore, it is possible to provide an RF battery cell 1 that is small in cell resistance.

If quantities per unit area $W_3$, $W_4$ are both no more than 500 g/m$^2$, the amount of carbon fibers loaded is not too large and the electrolyte solutions easily flow. Because the electrolyte solutions are easily supplied, positive electrode 13 and negative electrode 14 can each perform battery reaction in a favorable manner. In this regard, it is possible to provide an RF battery cell 1 that is small in cell resistance.

According to the above, the RF battery cell 1 with the above quantity-per-unit-area ratio exceeding 100% and quantities per unit area $W_3$, $W_4$ falling within a range of no less than 20 g/m$^2$ and no more than 500 g/m$^2$ enables easily adjusting the cell resistance into a practical range.

If quantities per unit area $W_3$, $W_4$ are both no less than 80 g/m$^2$, more specifically no less than 90 g/m$^2$, even more specifically no less than 100 g/m$^2$, the battery reactivity is enhanced. If quantities per unit area $W_3$. $W_4$ are no more than 490 g/m$^2$, more specifically no more than 480 g/m$^2$, even more specifically no more than 470 g/m$^2$, the electrolyte solutions are excellent in circulation and are supplied to positive electrode 13 and negative electrode 14 in a favorable manner.

Where the quantity-per-unit-area ratio exceeds 100% and quantities per unit area $W_3$, $W_4$ are no less than 80 g/m$^2$ and no more than 490 g/m$^2$, more specifically no less than 100 g/m$^2$ and no more than 470 g/m$^2$, RF battery cell 1 is excellent in battery reactivity and electrolyte solution circulation. In particular, where the quantity-per-unit-area ratio exceeds 100% and quantities per unit area $W_3$, $W_4$ are no less than 50 g/m$^2$ and no more than 200 g/m$^2$, RF battery cell 1 is excellent in battery reactivity and is also more excellent in electrolyte solution circulation and easily becomes smaller in cell resistance. Where the quantity-per-unit-area ratio exceeds 100% and quantities per unit area $W_3$, $W_4$ are, for example, no less than 300 g/m$^2$ and no more than 450 g/m$^2$, RF battery cell 1 is excellent in battery reactivity.

<Fiber Diameter>

In each of the fiber assembles included in positive electrode 13 and negative electrode 14, generally, as an average fiber diameter of the carbon fibers is smaller, the cell resistance tends to be smaller. A reason for this is as follows. Where the quantity per unit area is constant, as the average fiber diameter is smaller, the number of carbon fibers included in the fiber assembly tends to be larger. As the number of carbon fibers is larger, the total surface area of carbon fibers in the carbon assembly tends to larger. As the surface area of the fiber assembly is larger, the battery reactivity tends to be higher. As a result, it is possible to perform battery reaction in a favorable manner and the cell resistance thus tends to be smaller. From the perspective of cell resistance reduction, the average fiber diameter may be, for example, no more than 20 μm.

On the other hand, in the fiber assembly included in negative electrode 14, where the average fiber diameter of the carbon fibers is no more than 20 μm, as charging progresses, the battery reactivity tends to be lowered in comparison with a case where the average fiber diameter exceeds 20 μm. One of reasons for this can be that if the carbon fibers contained in negative electrode 14 are thin, the carbon fibers are not easily brought into contact with active material ions in the electrolyte solution because of hydrogen gas generated along with the progress of the charging. Since the battery reactivity of negative electrode 14 is easily lowered because of the fiber diameter in addition to the difference in quantity per unit area, as charging progresses, the amount of hydrogen gas generated tends to be large. Therefore, stopping charging based on the amount of hydrogen gas generated prevents an excessive increase in concentration of oxidizer ions in the positive-electrode electrolyte solution. Accordingly, overcharging of the positive-electrode electrolyte solution is more reliably prevented.

If the average fiber diameter is, for example, no more than 18 μm, more specifically no more than 15 μm, overcharging of the positive-electrode electrolyte solution can easily be prevented while an RF battery cell 1 that is small in cell resistance being provided. If the average fiber diameter is, for example, no less than 1 μm and no more than 20 μm, the fiber assembly is excellent in mechanical strength as well as battery reactivity.

The average fiber diameter is calculated as follows. A section of the fiber assembly is obtained by cutting the fiber assembly along a plane that is parallel to a thickness direction. A diameter of a circle having an area that is equal to a sectional area of a carbon fiber in one section is determined as a fiber diameter of the carbon fiber. Five or more fields of view are employed for one section, and fiber diameters of three or more carbon fibers are measured for each field of view. An average of the 15 or more measured fiber diameters is determined as an average fiber diameter.

Others

A plane area and a thickness of positive electrode 13 and negative electrode 14 can appropriately be selected as long as the plane area and the thickness meet the above-described quantity-per-unit-area ratio. A planar shape of positive electrode 13 and negative electrode 14 can appropriately be selected. A typical planar shape can be a rectangular shape, which is illustrated in FIG. 2.

Major Operation and Effects

In RF battery cell 1 of the embodiment, quantity per unit area $W_3$ of positive electrode 13 is larger than quantity per unit area $W_4$ of negative electrode 14, and thus, a phenomenon based on a difference between the battery reactivity of positive electrode 13 and the battery reactivity of negative electrode 14 can be used for operation control. Stopping charging based on the above phenomenon, for example, generation of hydrogen gas on the negative electrode side, enables preventing overcharging of the positive-electrode electrolyte solution without measuring an SOC or an OCV. Consequently, it is possible to prevent excessive oxidation of positive electrode 13.

Cell stack 2 of the embodiment and RF battery system 10 of the embodiment include RF battery cell 1 of the embodiment. Therefore, as described above, stopping charging based on generation of hydrogen gas enables preventing excessive oxidation of positive electrode 13 without measuring the SOC or the OCV.

Test Example 1

RF battery cells with different combinations of quantities per unit area of positive electrodes and quantities per unit area of negative electrodes were built and charge and discharge were conducted with the RF battery cells to investigate a relationship between the quantities per unit area and oxidation states of the positive electrodes.

Here, each of the positive electrodes and the negative electrodes is carbon felt, an average fiber diameter of carbon fibers of which is no more than 20 μm, and has the relevant quantity per unit area (g/m$^2$) indicated in Table 1. Also, a quantity-per-unit-area ratio (%) in each sample is indicated in Table 1. A quantity-per-unit-area ratio (%) is a ratio of a quantity per unit area of a positive electrode where a quantity per unit area of a negative electrode is 100%, and is calculated by (quantity per unit area of positive electrode/quantity per unit area of negative electrode)×100.

The RF battery cells in the respective samples are single-cell batteries having substantially similar specifications except the quantity per unit area differences. The specifications include, e.g., a structure of the single-cell battery, and sizes of members included in the single-cell battery, for example, a plane area of each electrode. Because of the quantity per unit area differences, initial values of cell resistivities in the respective samples are different. For the initial values of the cell resistivities in the respective samples, relative values based on an initial value of a cell resistivity of sample No. 100 are indicated in Table 1. The initial values of the cell resistivities (Ω·cm$^2$) here were obtained by conducting charging and discharging under the following conditions using the single-cell batteries of the respective samples.

(Charge and Discharge Conditions)

Three charge-discharge cycles were conducted under the condition that switching between charge and discharge is performed upon a predetermined switching voltage set in advance being reached. The charge and discharge were conducted using a constant current with a current density of 90 mA/cm$^2$. Each of electrolyte solutions used is a vanadium-based electrolyte solution, that is, a vanadium sulfate aqueous solution. A vanadium ion concentration of the electrolyte solution is 2 mol/L.

An average voltage and an average current in a first cycle were calculated, and furthermore, a resistance value=(average voltage/average current) was calculated. An initial value of a cell resistivity is a value calculated by the product of the resistance value and the plane area of each electrode.

After an end of the three charge-discharge cycles under the above conditions, the positive electrode was removed from each of the single-cell batteries of the samples, whether or not the positive electrode had been discolored was visually checked, and Table 1 indicate results of the check. Discoloring of the positive electrode occurs as a result of carbon fibers being oxidized. It can be considered that as there are more discolored portions, the oxidation progresses more. In Table 1, "Yes (*)" means that although the positive electrode was discolored, discolored parts are fewer than those of sample No. 100.

An amount of hydrogen gas generated on the negative electrode side until the end of the three charge-discharge cycles under the above conditions was investigated and Table 1 indicates results of the investigation. Here, the amount of hydrogen gas generated is a ratio (vol ppm) relative to a volume of gas phase present in a tank that stores the negative-electrode electrolyte solution. The amount of hydrogen gas generated was measured by gas chromatography.

After the end of the three charge-discharge cycles under the above conditions, the cell resistivities of the respective samples were measured. Each of the cell resistivities is a value calculated by obtaining an average voltage and an average current in a third cycle and further calculating the product of a resistance value=(average voltage/average current) and the plane area of each electrode. An amount of increase in the cell resistivity in the third cycle relative to the initial value of the cell resistivity was calculated and Table 1 indicates results of the calculation. The amount of increase in cell resistance was calculated by (cell resistivity in third cycle/initial value of cell resistivity).

TABLE 1

| Sample No. | Quantity per unit area g/m² | | Quantity-per-unit-area ratio % | | Amount of hydrogen gas generated Vol ppm | Electrode discoloring Positive electrode | Initial value of cell resistivity Relative value | Amount of increase in cell resistance Relative value relative to initial value |
|---|---|---|---|---|---|---|---|---|
| | Positive electrode | Negative electrode | Positive electrode | Negative electrode | | | | |
| 1 | 154 | 144 | 107 | 100 | 1997 | No | 0.81 | 1.24 |
| 2 | 495 | 442 | 112 | 100 | 3005 | No | 0.85 | 1.34 |
| 3 | 237 | 197 | 120 | 100 | 2784 | No | 0.96 | 1.34 |
| 4 | 28 | 22 | 127 | 100 | 6512 | No | 0.65 | 1.53 |
| 5 | 150 | 110 | 136 | 100 | 1852 | No | 0.77 | 1.60 |
| 6 | 397 | 250 | 159 | 100 | 5545 | No | 0.94 | 1.72 |
| 7 | 370 | 219 | 169 | 100 | 9899 | No | 0.92 | 1.88 |
| 100 | 18 | 18 | 100 | 100 | 302 | Yes | 1 | 1 |
| 101 | 722 | 704 | 103 | 100 | 354 | Yes (*) | 1.32 | 1.03 |
| 102 | 101 | 96 | 105 | 100 | 385 | Yes (*) | 0.73 | 1.03 |
| 103 | 15 | 12 | 125 | 100 | 650 | Yes (*) | 1.31 | 1.05 |
| 104 | 702 | 648 | 108 | 100 | 444 | Yes (*) | 1.54 | 1.08 |

As indicated in Table 1, it can be seen that the differences in quantity per unit area cause differences in oxidation state, here, discoloring state of the positive electrode. More specifically, in sample No. 100 in which the quantity per unit area of the positive electrode and the quantity per unit area of the negative electrode are equal to each other, that is, the quantity-per-unit-area ratio is 100%, the positive electrode was discolored. On the other hand, in each of sample Nos. 1 to 7 in which the quantity per unit area of the positive electrode is larger than the quantity per unit area of the negative electrode, that is, the quantity-per-unit-area ratio exceeds 100%, the positive electrode was not discolored. Accordingly, it can be considered that in sample Nos 1 to 7, oxidation of the positive electrode did not easily progress relative to sample No. 100. Hereinafter, sample Nos. 1 to 7 may be referred to as "specific sample group".

In the specific sample group, one of reasons that oxidation of the positive electrode did not easily progress can be that a concentration of vanadium (V) ions in the positive-electrode electrolyte solution in the specific sample group was not too high at an end of the charging. It can be considered that oxidation of the positive electrode did not easily progress because there are not too many oxidizer ions such as vanadium (V) ions.

Also, in each battery cell in the specific sample group, the amount of hydrogen gas generated is larger than that of sample No. 100. A reason for this can be considered as follows. In each negative-electrode cell in the specific sample group, as charging progresses, a phenomenon other than battery reaction, such as electrolysis of water, tends to occur. As a result, the amount of hydrogen gas generated becomes larger. Here, also because of the average fiber diameter of the carbon fibers being no more than 20 μm, it can be considered that as charging progressed, the amount of hydrogen gas generated easily increased.

Furthermore, in each battery cell in the specific sample group, the amount of increase in cell resistance is larger than that of sample No. 100. A reason for this can be that as charging progresses, in the negative-electrode cell, as described above, a phenomenon other than battery reaction, such as an increase in amount of hydrogen gas generated, tends to occur, which hinders battery reaction from occurring in a favorable manner.

Accordingly, when an RF battery cell with a quantity-per-unit-area ratio of more than 100% is operated, stopping charging based on the amount of hydrogen gas generated enables easily keeping the concentration of oxidizer ions low. Consequently, it is possible to prevent excessive oxidation of the positive electrode by the oxidizer ions. Also, a trigger for stopping charging is a parameter other than an SOC and an OCV. Therefore, even where neither the SOC nor the OCV can be measured, it is possible to prevent excessive oxidation of the positive electrode.

In this test, charge and discharge were conducted with the switching voltage kept constant. The switching voltage is represented by the sum of the open circuit voltage (OCV) of the electrolyte solution and current×cell resistance. Therefore, if the switching voltage is constant, as the cell resistance increases, the OCV is relatively lowered. If the OCV is lowered, the SOC is also lowered. In other words, in the positive-electrode electrolyte solution, oxidizer ions such as vanadium (V) ions decrease. In the specific sample group, as the sample number is larger, the amount of increase in cell resistance tends to be larger and oxidizer ions can be considered as being fewer. Therefore, a risk of overcharge is reduced. In this test, the cell resistivities were measured, and where the amount of increase in cell resistance is large, the amount of hydrogen gas generated is also large. Accordingly, the amount of hydrogen gas generated can be used as a trigger for stopping charging.

Besides the above, the following can be seen from this test.

The specific sample group and sample Nos. 101 and 102 will be compared. From this comparison, it can be seen that if the quantity-per-unit-area ratio is more than 105%, more specifically no less than 107%, oxidation of the positive electrode does not easily progress. Also, in the specific sample group, the amount of hydrogen gas generated is larger and the amount of increase in cell resistance is also larger than those of sample Nos. 101 and 102. Accordingly, if the quantity-per-unit-area ratio is no less than 107%, stopping charging based on the amount of hydrogen gas generated is expected to more reliably prevent excessive oxidation of the positive electrode. Also, in view of the amount of hydrogen gas generated, it can be considered that the quantity-per-unit-area ratio is preferably no more than 170%.

The specific sample group and sample Nos. 103 and 104 will be compared. From this comparison, if the quantity-per-unit-area ratio between the positive electrode and the negative electrode is more than 100% and the quantities per unit area of the positive electrode and the negative electrode are more than 15 g/m² and less than 648 g/m², more specifically no less than 20 g/m² and no more than 500 g/m², oxidation of the positive electrode does not easily progress and the initial value of the cell resistivity tends to be small. Also, the amount of hydrogen gas generated tends to be large and thus can easily be used as a trigger for stopping charging.

In this test, the single-cell batteries were used, and multi-cell batteries exhibit a tendency that is similar to the above.

The present invention is not limited to these examples but is indicated by the claims and all changes that come within the meaning and range of equivalency of the claims are to be embraced within the present invention.

For example, in test example 1, the quantities per unit area of the positive electrodes and the quantities per unit area of the negative electrodes, the compositions of the electrolyte solutions, the number of cells, etc., can be changed.

REFERENCE SIGNS LIST

1 RF battery cell
10 RF battery system
11 separator; 13 positive electrode; 14 negative electrode; 15 bipolar plate 16, 17 tank; 18, 19 pump
2 cell stack
20 sub cell stack; 21 end plate; 22 fastening member
23 supply/drainage plate
3 cell frame
30 frame body; 33, 34 solution-supply manifold; 35, 36 solution-drainage manifold
38 seal material
90 intervening device; 91 power generation unit; 92 load
160, 170 piping; 161, 171 outward piping, 162, 172 return piping

The invention claimed is:

1. A redox flow battery cell comprising a positive electrode and a negative electrode, wherein
    each of the positive electrode and the negative electrode is an assembly consisting essentially of a carbon fiber assembly consisting of a plurality of carbon fibers, and
    a mass of the carbon fiber assembly per unit area of the positive electrode is larger than a mass of the carbon fiber assembly per unit area of the negative electrode.

2. The redox flow battery cell according to claim 1, wherein a ratio of the mass of the assembly per unit area of the positive electrode to the mass of the assembly per unit area of the negative electrode is no less than 107%.

3. The redox flow battery cell according to claim 1, wherein the mass of the assembly per unit area of the positive electrode and the mass of the assembly per unit area of the negative electrode are no less than 20 g/m² and no more than 500 g/m².

4. The redox flow battery cell according to claim 1, wherein an average fiber diameter of the carbon fibers is no more than 20 μm.

5. The redox flow battery cell according to claim 1, wherein the carbon fiber assembly is in a form of felt, cloth or paper.

6. The redox flow battery cell according to claim 5, wherein an average fiber diameter of the carbon fibers is no less than 1 μm and no more than 20 μm.

7. A cell stack comprising a plurality of the redox flow battery cells according to claim 1.

8. A redox flow battery system comprising the cell stack according to claim 7.

9. A redox flow battery system comprising the redox flow battery cell according to claim 1.

* * * * *